May 6, 1930. H. G. SPILSBURY 1,757,148
RAIL WELDING APPARATUS
Filed Aug. 6, 1927

Inventor
Hugh G. Spilsbury
By his Attorney
Albert M. Austin

Patented May 6, 1930

1,757,148

UNITED STATES PATENT OFFICE

HUGH G. SPILSBURY, OF CRANFORD, NEW JERSEY, ASSIGNOR, BY MESNE ASSIGNMENTS, TO FRANCIS EARLE, OF MONTCLAIR, NEW JERSEY

RAIL-WELDING APPARATUS

Application filed August 6, 1927. Serial No. 211,213.

This invention relates to rail welding apparatus and more particularly to clamps for positioning molds such as are commonly used in the aluminothermic welding process.

In applying a mold to a rail, it is desirable to use some clamping means for applying pressure to the two sides of the mold and holding the same in firm engagement with the rails which are to be welded. It is also desirable to apply clamps to the two rails and to so attach said clamps that longitudinal pressure may be applied to the two rails for forcing the ends thereof firmly together. This invention provides means associated with the rail clamps for applying and rigidly securing the mold and eliminates the necessity for a large number of extra parts and additional clamping means therefor.

One method of practicing this invention comprises applying compression elements between a portion of the rail clamp and the mold and adjusting these elements so as to force the mold firmly against the rail. By utilizing the clamp itself as a portion of the mold retaining means, the total number of parts is reduced and the operation thereof accordingly simplified.

The invention also consists in certain new and original features of construction and combinations of parts hereinafter set forth and claimed.

Figure 1:
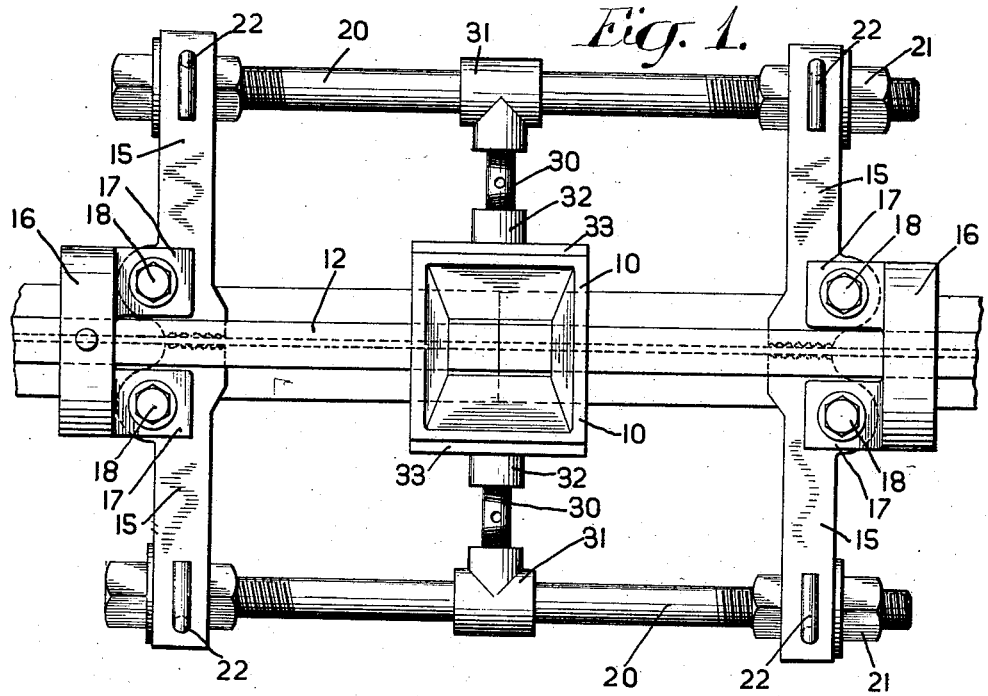

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a plan view of a mold clamping device constructed in accordance with this invention.

Figure 2:
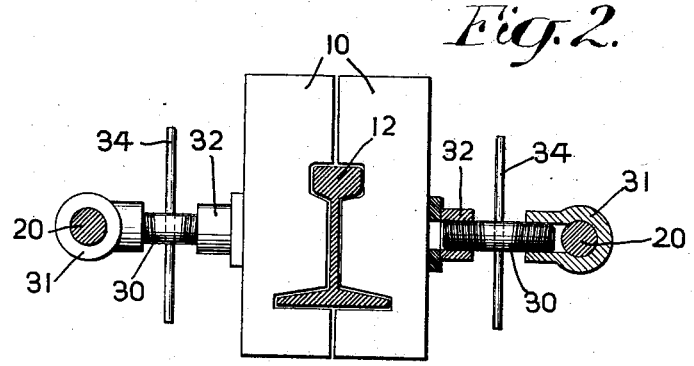

Fig. 2 is an elevation partly in section showing the mold and clamping means therefor.

Like reference characters denote like parts in the several figures of the drawings.

In the following description and in the claims parts will be identified by specific names for convenience, but they are intended to be as generic in their application to similar parts as the art will permit.

Referring to the drawings more in detail in which one means for practicing this invention is set forth by way of illustration only, a mold comprising sections 10, 10 of the usual and well known type is shown as applied to a rail 12 by suitable clamping means to be hereinafter described.

A rail clamp which has been shown for purposes of illustration, comprises bars 15 pivoted to yokes 16 on opposite sides of the rail. Yoke 16 may be U-shaped and provided with longitudinally extending projections 17 through which pivot pins 18 are inserted. Bars 15 pivoted on said pins 18 are provided at one end with serrations for the purpose of securing a firm grip against the side of the rail. Said bars are usually applied to the rail web and are so positioned with respect to the yoke that said serrations come in contact with two sides of said web. The serrations should be located entirely off centre with respect to pins 18 to permit the bars 15 to be folded back when pressure is released, and should extend parallel to the rail when in gripping position so that all parts of the serrations may make contact with the rail.

The ends of bars 15 opposite to said serrations are formed bifurcated to provide means for receiving suitable pressure rods 20, which are placed through the bifurcations of the two bars 15 on the same side of a rail. Pressure may be applied thereto by means of nuts 21 which are threaded on the ends of said rod and pin 22 may be passed through the bifurcated ends for preventing rod 20 from becoming disengaged therefrom.

The above described clamp may be applied to a rail by folding said bars 15 back against the yoke 16 whereby the serrated ends are separated by an amount sufficient to permit said bars to be passed over the rail head. Bars 15 may then be moved about pivot 18 for causing the serrations to come in contact with the web of the rail, pressure bars 20 inserted in the bifurcated ends, pins 22 inserted for locking the same and pressure applied by tightening nuts 21. The operation of tightening said nuts therefor serves to force the serrated ends of bars 15 securely against the rail web and also to apply longitudinal pressure to said rail and draw adjacent ends firmly together. The particular type of rail clamp employed however, forms no part of the present invention, any type having a part extending parallel to the rail being suitable as will be hereinafter set forth.

Mold sections 10 which are designed to receive molten metal such as that commonly produced by the aluminothermic process, may be located around the proposed joint and securely clamped thereabout by means of rods 30 which are provided at their ends with reverse threads. One end of said rod 30 is secured in a T coupling 31, which is inserted over rods 20 and securely held thereby. The other end of said rod 30 is engaged by coupling 32 having a thread of an opposite pitch to that of coupling 31, and provided with a bearing surface for contacting with bar 33. Said bar 33 may be extended across the face of mold section 10 and when pressure is applied thereto, will serve to hold said section firmly against the rail. Rod 30 may be adjusted by any suitable means such as a bar 34 which may be inserted through a hole drilled in said rod and operated therein in a manner similar to the well known vise handle.

When the above described parts have been placed in operative position, rod 30 may be rotated as by handle 34 and will serve to firmly force bar 33 against the side of mold 11. This pressure will be resisted by clamp bar 20 which as above set forth may be securely fastened as by pins 22 passing through the ends of bars 15.

In order to remove the molds it is only necessary to slightly loosen bar 33 as by turning rod 30 in the reverse direction. Bar 33 may then be removed and the clamping means comprising rod 30 and coupling 32 may be rotated about rod 20 to an inoperative position, whereby ample space will be obtained for removing the mold sections from around the rail.

By means of the above described apparatus, the number of parts employed in clamping a rail and applying a mold thereto in the aluminothermic welding process is materially reduced since a portion of the rail clamp itself is utilized for applying pressure to and maintaining the mold firmly against the side of the rail. The device is simple to assemble since it is only necessary to apply the rail clamps and after positioning the various parts of the mold itself to compress the same by rotation of rod 30 in the proper direction. The device may also be readily removed from the rail since it is only necessary to loosen the parts a sufficient amount to allow them to be swung free from the mold.

Since aluminothermic welds are commonly made in the field, reduction of parts involves a substantial saving in the cost of transportation and operation and reduces the liability of certain parts becoming lost in transit. Furthermore, the weight of the complete appliance is not appreciably greater than that of the rail clamps and the mold.

In the drawings accompanying and forming part of this specification, a practical commercial embodiment of the invention is disclosed, but as such illustration is primarily for purposes of disclosure, it will be understood that the structure may be modified in various respects without departure from the broad spirit and scope of the invention as hereinafter defined and claimed.

What is claimed is:

1. A device for applying a mold to a rail in the aluminothermic welding process which comprises a pair of rail clamps having members extending longitudinally of said rails and spaced therefrom, a pair of mold sections adapted to be positioned about said rails and holding means therefor co-operating with said members comprising compression members having oppositely inclined threads.

2. A device for applying a mold to a rail in the aluminothermic welding process which comprises a pair of rail clamps having members extending longitudinally of said rails and spaced therefrom, a pair of mold sections adapted to be positioned about said rails and holding means therefor comprising a rod having threads of opposite pitch at the two ends thereof and couplings co-operating therewith, one of said couplings being attached to said longitudinally extending clamp member and the other of said couplings being adapted to apply pressure to said mold.

3. A device for applying a mold to a rail in the aluminothermic welding process which comprises a pair of rail clamps having members extending longitudinally of said rails and spaced therefrom, a pair of mold sections adapted to be positioned about said rails and holding means therefor comprising pressure rods having threads of opposite pitch at the two ends thereof, a T coupling for receiving one end of said rod, said coupling being positioned on said longitudinally extending clamp member and means associated with the other end of said rod for applying pressure to said mold.

4. A device for applying a mold to a rail in the aluminothermic welding process which comprises a pair of rail clamps having members extending longitudinally of said rails and spaced therefrom, a pair of mold sections adapted to be positioned about said rails and holding means therefor comprising pressure rods having threads of opposite pitch at the two ends thereof, a T coupling for receiving one end of said rod, said coupling being positioned on said longitudinally extending clamp member and means associated with the other end of said rod for applying pressure to said mold, said means comprising a pressure bar extending across the face of said mold and a coupling co-operating with said compression rod.

5. A device for applying a mold to a rail in the aluminothermic welding process which comprises a pair of rail clamps having members extending longitudinally of said rails and spaced therefrom, a pair of mold sections adapted to be positioned about said rails and holding means therefor comprising a rod having its two ends oppositely threaded, means for securing said rod to said longitudinally extending clamp member and to said mold and means for turning said rod for applying pressure to said mold.

6. A device for applying a mold to a rail in the aluminothermic welding process which comprises a pair of rail clamps having members extending longitudinally of said rails and spaced therefrom, a pair of mold sections adapted to be positioned about said rails and holding means therefor comprising a rod having its two ends oppositely threaded means for securing said rod to said longitudinally extending clamp member and to said mold and means for turning said rod for applying pressure to said mold, said means comprising a rod slidable transversely of said threaded member.

In testimony whereof I have hereunto set my hand.

HUGH G. SPILSBURY.